United States Patent
Gandolfo

(10) Patent No.: US 7,184,767 B2
(45) Date of Patent: Feb. 27, 2007

(54) SYSTEM AND METHOD OF COMMUNICATION BETWEEN MULTIPLE POINT-COORDINATED WIRELESS NETWORKS

(75) Inventor: Pierre T. Gandolfo, San Ramon, CA (US)

(73) Assignee: Freescale Semiconductor, Inc., Austin, TX (US)

( * ) Notice: Subject to any disclaimer, the term of this patent is extended or adjusted under 35 U.S.C. 154(b) by 362 days.

(21) Appl. No.: 10/305,066

(22) Filed: Nov. 27, 2002

(65) Prior Publication Data

US 2003/0224787 A1 Dec. 4, 2003

Related U.S. Application Data

(60) Provisional application No. 60/333,524, filed on Nov. 28, 2001.

(51) Int. Cl.
*H04Q 7/20* (2006.01)
(52) U.S. Cl. .................. 455/435.2; 455/434; 455/422.1
(58) Field of Classification Search ............. 455/435.2, 455/422.1, 434
See application file for complete search history.

(56) References Cited

U.S. PATENT DOCUMENTS

| | | | |
|---|---|---|---|
| 6,826,414 B1* | 11/2004 | Reynolds et al. ........... | 455/555 |
| 6,836,653 B1* | 12/2004 | Kang .......................... | 455/408 |
| 6,842,616 B2* | 1/2005 | Takano et al. ............ | 455/435.2 |
| 2001/0016499 A1* | 8/2001 | Hamabe ..................... | 455/454 |
| 2002/0072363 A1* | 6/2002 | Riihinen et al. ............ | 455/432 |
| 2002/0086685 A1* | 7/2002 | Wallentin et al. ........... | 455/458 |

FOREIGN PATENT DOCUMENTS

| | | |
|---|---|---|
| WO | WO 01 41348 A | 6/2001 |
| WO | WO 01/41348 A2 | 6/2001 |
| WO | WO 01 43362 A | 6/2001 |
| WO | WO 01/43362 A1 | 6/2001 |
| WO | WO 01 97448 A | 12/2001 |

* cited by examiner

*Primary Examiner*—Erika A. Gary
*Assistant Examiner*—S. Smith

(57) ABSTRACT

A wireless scatternet is provided that has at least two networks, each including a controller and one or more devices. The controller of each network has a usable physical area that indicates the farthest distance to which the controller can successfully communicate. The controllers will pass network information to each other in various ways depending upon the extent of overlap between the networks. If two networks have visible overlap, the controllers will pass the network information directly. If they have hidden overlap, one controller will use a device in the other controller's network to pass the network information. If they have indirect overlap, one device from each network will together in a child network, and the controllers will pass the network information via the devices in this child network. The network information may be passed through beacons or a separate broadcast message.

4 Claims, 10 Drawing Sheets

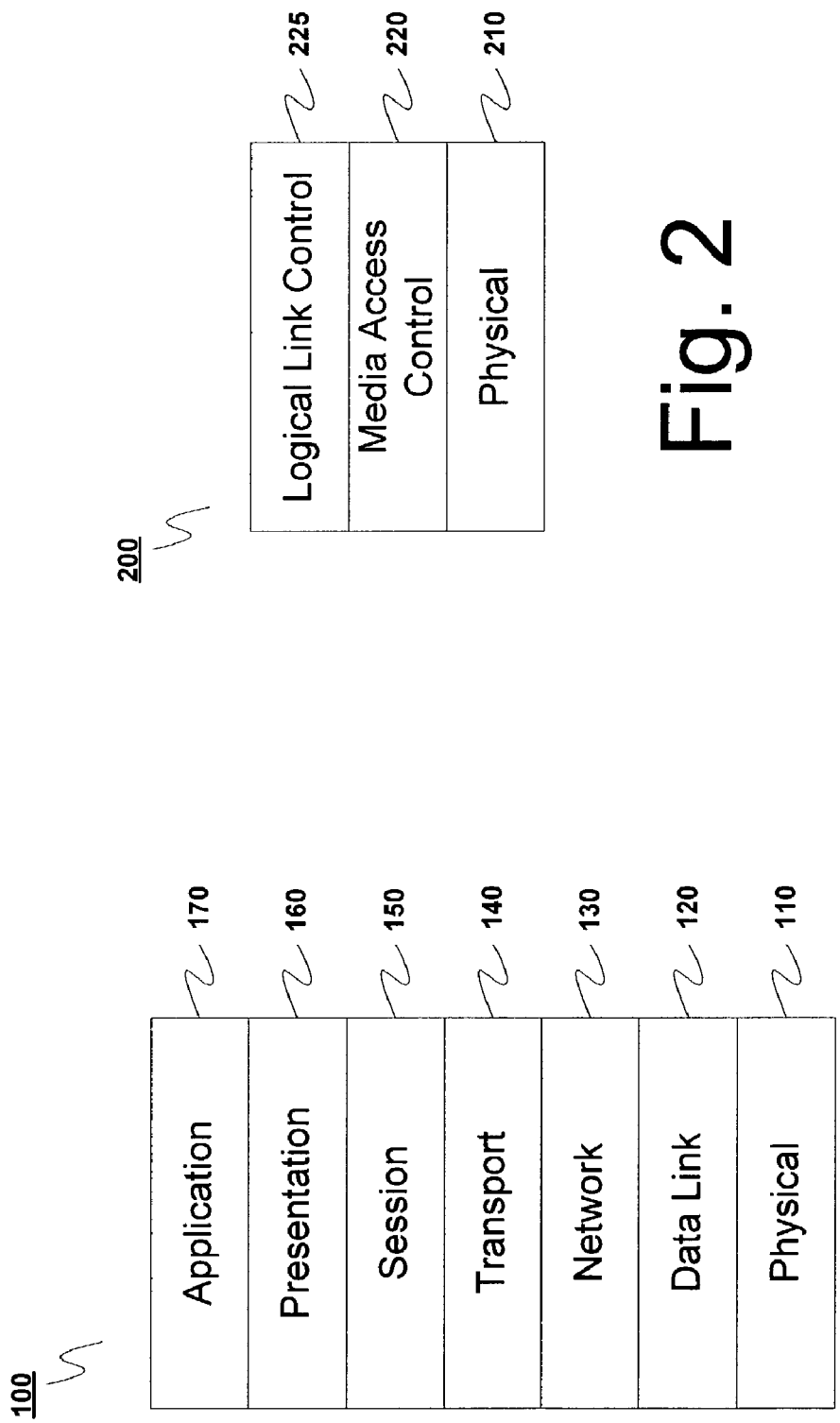

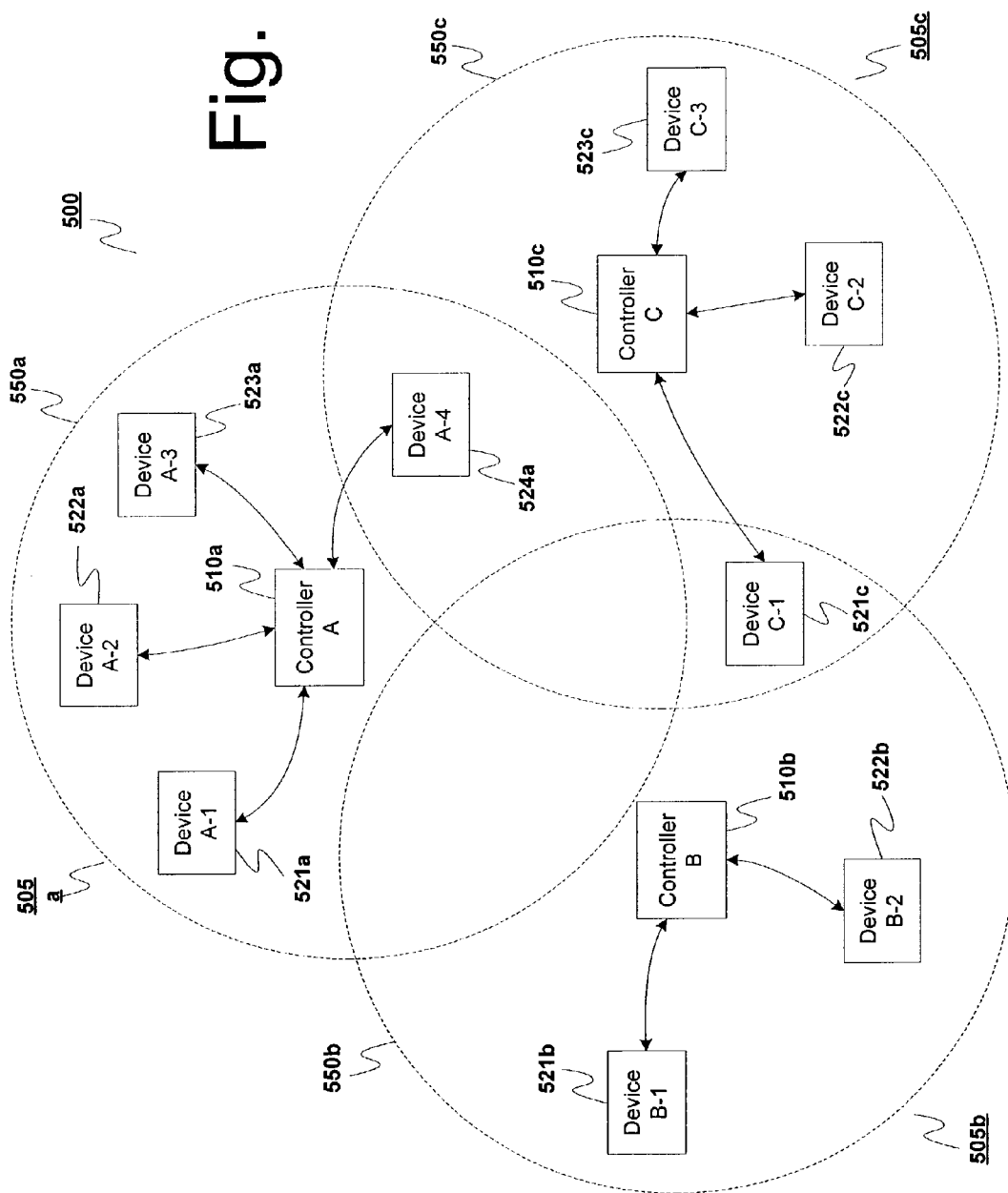

SYSTEM AND METHOD OF COMMUNICATION BETWEEN MULTIPLE POINT-COORDINATED WIRELESS NETWORKS

CROSS REFERENCE TO RELATED APPLICATIONS

The present document claims the benefit of the earlier filing date of commonly owned, co-pending U.S. provisional patent application Ser. No. 60/333,524 filed Nov. 28, 2001, entitled SCATTERNET OR MULTI-HOP AD-HOC NETWORKING TOPOLOGY, the contents of which are incorporated by reference.

BACKGROUND OF THE INVENTION

The present invention relates to wireless personal area networks and wireless local area networks. More particularly, the present invention relates to systems, methods, devices, and computer program products for facilitating communications between multiple overlapping or adjacent wireless personal area networks or wireless local area networks.

The International Standards Organization's (ISO) Open Systems Interconnection (OSI) standard provides a seven-layered hierarchy between an end user and a physical device through which different systems can communicate. Each layer is responsible for different tasks, and the OSI standard specifies the interaction between layers, as well as between devices complying with the standard.

FIG. 1 shows the hierarchy of the seven-layered OSI standard. As seen in FIG. 1, the OSI standard 100 includes a physical layer 110, a data link layer 120, a network layer 130, a transport layer 140, a session layer 150, a presentation layer 160, and an application layer 170.

The physical (PHY) layer 110 conveys the bit stream through the network at the electrical, mechanical, functional, and procedural level. It provides the hardware means of sending and receiving data on a carrier. The data link layer 120 describes the representation of bits on the physical medium and the format of messages on the medium, sending blocks of data (such as frames) with proper synchronization. The networking layer 130 handles the routing and forwarding of the data to proper destinations, maintaining and terminating connections. The transport layer 140 manages the end-to-end control and error checking to ensure complete data transfer. The session layer 150 sets up, coordinates, and terminates conversations, exchanges, and dialogs between the applications at each end. The presentation layer 160 converts incoming and outgoing data from one presentation format to another. The application layer 170 is where communication partners are identified, quality of service is identified, user authentication and privacy are considered, and any constraints on data syntax are identified.

The IEEE 802 Committee has developed a three-layer architecture for local networks that roughly corresponds to the physical layer 110 and the data link layer 120 of the OSI standard 100. FIG. 2 shows the IEEE 802 standard 200.

As shown in FIG. 2, the IEEE 802 standard 200 includes a physical (PHY) layer 210, a media access control (MAC) layer 220, and a logical link control (LLC) layer 225. The PHY layer 210 operates essentially as the PHY Layer 110 in the OSI standard 100. The MAC and LLC layers 220 and 225 share the functions of the data link layer 120 in the OSI standard 100. The LLC layer 225 places data into frames that can be communicated at the PHY layer 210; and the MAC layer 220 manages communication over the data link, sending data frames and receiving acknowledgement (ACK) frames. Together the MAC and LLC layers 220 and 225 are responsible for error checking as well as retransmission of frames that are not received and acknowledged.

FIG. 3 is a block diagram of a wireless network 305 that could use the IEEE 802 standard 200, specifically the proposed IEEE 802.15 standard. In a preferred embodiment the network 305 is a wireless personal area network (WPAN), or piconet. However, it should be understood that the present invention also applies to other settings where bandwidth is to be shared among several users, such as, for example, wireless local area networks (WLAN), or any other appropriate wireless network.

When the term piconet is used, it refers to a network of devices connected in an ad hoc fashion, having one device act as a controller (i.e., it functions as a master) while the other devices follow the instructions of the controller (i.e., they function as slaves). The controller can be a designated device, or simply one of the devices chosen to function as a controller. One primary difference between devices and the controller is that the controller must be able to communicate with all of the devices in the network, while the various devices need not be able to communicate with all of the other devices in the network.

As shown in FIG. 3, the network 305 includes a controller 310 and a plurality of devices 321–325. The controller 310 serves to control the operation of the network 305. As noted above, the system of controller 310 and devices 321–325 may be called a piconet, in which case the controller 310 may be referred to as a piconet controller (PNC). Each of the devices 321–325 must be connected to the controller 310 via primary wireless links 330, and may also be connected to one or more other devices 321–325 via secondary wireless links 340. Each device 321–325 of the network 305 may be a different wireless device, for example, a digital still camera, a digital video camera, a personal data assistant (PDA), a digital music player, or other personal wireless device.

In some embodiments the controller 310 may be the same sort of device as any of the devices 321–325, except with the additional functionality for controlling the system and the requirement that it communicate with every device 321–325 in the network 305. In other embodiments the controller 310 may be a separate designated control device.

The various devices 321–325 are confined to a usable physical area 350, which is set based on the extent to which the controller 310 can successfully communicate with each of the devices 321–325. Any device 321–325 that is able to communicate with the controller 310 (and vice versa) is within the usable area 350 of the network 305. As noted, however, it is not necessary for every device 321–325 in the network 305 to communicate with every other device 321–325.

FIG. 4A is a block diagram of a controller 310 or a device 321–325 from the network 305 of FIG. 3. As shown in FIG. 4A, each controller 310 or device 321–325 includes a physical (PHY) layer 410, a media access control (MAC) layer 420, a set of upper layers 430, and a management entity 440.

The PHY layer 410 communicates with the rest of the network 305 via a primary or secondary wireless link 330 or 340. It generates and receives data in a transmittable data format and converts it to and from a format usable through the MAC layer 420. The MAC layer 420 serves as an interface between the data formats required by the PHY layer 410 and those required by the upper layers 430. The upper layers 205 include the functionality of the device 321–325. These upper layers 430 may include TCP/IP, TCP, UDP, RTP, IP, LLC, or the like.

Typically, the controller 310 and the devices 321–325 in a WPAN share the same bandwidth. Accordingly, the controller 310 coordinates the sharing of that bandwidth. Standards have been developed to establish protocols for sharing bandwidth in a wireless personal area network (WPAN) setting. For example, the IEEE standard 802.15.3 is being developed to provide a specification for the PHY layer 410 and the MAC layer 420 in such a setting where bandwidth is shared using time division multiple access (TDMA). Using this standard, the MAC layer 420 defines frames and super-frames through which the sharing of the bandwidth by the devices 321–325 is managed by the controller 310 and/or the devices 321–325.

FIG. 4B illustrates an exemplary structure of a series of super-frames having a plurality of time slots during a contention free period according to a conventional method of operation. As shown in FIG. 4A, the data transmission scheme includes transmitting successive super-frames 450 in time across the network 300. Each super-frame 450 includes a beacon 460, an optional contention access period (CAP) 470, and a contention free period (CFP) 480. The contention free period 480 includes one or more time slots 490. These can be guaranteed time slots (GTSs), management time slots (MTSs), or other types of time slots, as desired by the network operation.

The super-frame 450 itself is a fixed time construct that is repeated in time. The specific duration of the super-frame 450 is described in the beacon 460. In actuality the beacon 460 includes information regarding how often the beacon 460 is repeated, which effectively corresponds to the duration of the super-frame 450. The beacon 460 also contains information regarding the network 300 and the identity of the controller 310.

In operation, the controller 310 uses the beacon 460 to define and assign the time slots 490. All devices 321–325 listen to the controller 310 during the beacon period 460. Each device 321–325 will receive zero or more time slots 490, being notified of each start time and duration from the controller 310 during the beacon period 460. This beacon information uses what is often called TLV format, which stands for type, length, and value. As a result, each device knows when to transmit and when to receive. The beacon period 460, therefore, is used to coordinate the transmitting and receiving of the devices 321–325.

The controller 310 sends the beacon 460 to all of the devices 321–325 at the beginning of each super-frame 450. The beacon 460 tells each device 321–325 the duration or super-frame 450 as well as other information about its MAC address, e.g., the size and duration of the contention access period 470, if any, and the duration of the contention free period 480.

Each beacon 460 will contain information that is not precisely a channel time allocation (CTA). One piece of information will define the beacon period 460 and describe the start time and the duration for the beacon period 460. Another will define the contention access period 470, if any, and describe the start time and the duration for the contention access period 470. Each beacon can also have multiple CTAs. There will be a CTA for each of the time slots 490. Using dynamic time slots 490, the slot assignments can change every super-frame with modified CTAs.

The network can pass control and administrative information between the controller 310 and the various devices 321–325 through the contention access period 470 or during a management time slot. For example, this can involve information about new devices that want to join the network 300.

If a new device 321–325 desires to be added to the network 300, it requests entry from the controller 310 in the contention access period 330 or during an association management time slot.

Individual devices then transmit data packets during the contention free period 480. The devices 321–325 use the time slots 490 assigned to them to transmit data packets to other devices (which may include the controller 310 if the controller 310 is also a device 321–325 within the network 300). Each device 321–325 may send one or more packets of data, and may request an immediate acknowledgement (ACK) frame from the recipient device 321–325 indicating that the packet was successfully received, or may request a delayed (grouped) acknowledgement. If an immediate ACK frame is requested, the transmitting device 321–325 should allocate sufficient time in the time slot 490 to allow for the ACK frame to arrive.

It is necessary to organize which devices 321–325 will be transmitting and which will be listening to avoid collisions of transmitted data. For example if device one 321 and device four 324 both try and transmit data at the same time, this data may collide and cause the receiving devices to fail in acquiring and receiving the signal.

The reason we allocate individual time slots 490 in the super-frame 450 is because when a given device, e.g., device one 321, is transmitting to another device, e.g., device five 325, it's really broadcasting its signal to everyone, i.e., broadcasting on the open air where anyone who happens to be listening can hear. We would prefer that while device one 321 was transmitting, device five 325 was the only device that was listening. This is basically a TDMA approach. Since the broadcast medium is wireless, when one device is transmitting the system has to limit who else can use the channel.

Since each particular device 321–325 knows its transmit start time and duration from information received during the beacon period 460, each device 321–325 can remain silent until it is its turn to transmit.

The time slots 490 shown in this embodiment may be of differing sizes. The starting times and durations of the time slots 490 are determined by the controller 310 and sent to the devices 321–325 in the beacon 460.

Using current networking topologies, devices in each network communicate wirelessly only with other devices in the same network. In order for a first device in one wireless network to communicate with a second device in another wireless network, the first device would have to use a wired backbone such as Ethernet, HomePNA, or HomePLUG to make the connection.

In this kind of a system, each wireless network forms a cell, and individual cells are connected via a wired backbone. Both IEEE 802.11 systems and HomeRF rely upon this sort of wired infrastructure topology.

Furthermore, in such networking schemes ad-hoc networking is rarely supported. And when it is supported, it is generally limited to a single piconet with no connection possible to other ad-hoc networks.

Another drawback of the infrastructure-based approach is its dependence on the wired backbone for linking networks to each other. In any given situation, there is no guarantee that this wired backbone will be available. Furthermore, most of the wired backbones that are in use today in home environments do not support the speed or quality of service requirements needed to handle multimedia applications.

It would therefore be advantageous to provide a way by which networks could communicate with adjacent networks without the need for a fixed wired backbone.

SUMMARY OF THE INVENTION

Consistent with the title of this section, only a brief description of selected features of the present invention is now presented. A more complete description of the present invention is the subject of this entire document.

A feature of the present invention is to provide a "smart" multi-network system with self-deployment and configuration capabilities.

Another feature of the present invention is to provide a way of discovering and updating wireless links between multiple overlapping or adjacent wireless networks.

Another feature of the present invention is to provide a way of accommodating communications between devices associated to different wireless networks without the need of a wired connection.

Some of these objects are accomplished by way of discovering and updating the wireless links between multiple wireless networks and building communication paths across the multi-hop ad-hoc network.

In accordance with these and other objects, an ultrawide bandwidth wireless scatternet is provided. The scatternet comprises a first network including a first controller for controlling operation of the first network, the first controller having a first usable physical area indicating a farthest distance to which the first controller can successfully communicate, and one or more first devices located in the first usable physical area; and a second network including a second controller for controlling operation of the second network, the second controller having a second usable physical area indicating a farthest distance to which the second controller can successfully communicate; and one or more second devices located in the second usable physical area. The first controller is within the second usable physical area and the second controller is within the first usable physical area. In this system the first and second controllers exchange network information data via an ultrawide bandwidth signal.

The network information data preferably includes at least one of: a router/controller identifier, an indicator of an age of the network information data, a count of a number of times the network information data has been passed between controllers or devices, a sequence number, a load feedback, a number of associated network devices, a list of neighborhood media access controller address, a list of supported data rates, a list of available network bridge connections, and a list of available network services.

The network information data may be exchanged via first and second ultrawide bandwidth beacons transmitted by the first and second controllers, respectively. Alternately, the network information data may be exchanged via first and second ultrawide bandwidth broadcast messages transmitted by the first and second controllers, respectively.

An ultrawide bandwidth wireless scatternet is also provided, comprising: a first network including a first controller for controlling operation of the first network, the first controller having a first usable physical area indicating a farthest distance to which the first controller can successfully communicate, and one or more first devices located in the first usable physical area; and a second network including a second controller for controlling operation of the second network, the second controller having a second usable physical area indicating a farthest distance to which the second controller can successfully communicate; and one or more second devices located in the second usable physical area. At least one of the one or more first devices is within the second usable physical area and operates as a relay device. In this system the first and second controllers exchange network information data via an ultrawide bandwidth signal passed through the relay device.

Another ultrawide bandwidth wireless scatternet is provided, comprising: a first network including a first controller for controlling operation of the first network, the first controller having a first usable physical area indicating a farthest distance to which the first controller can successfully communicate, and one or more first devices located in the first usable physical area; and a second network including a second controller for controlling operation of the second network, the second controller having a second usable physical area indicating a farthest distance to which the second controller can successfully communicate; and one or more second devices located in the second usable physical area. One of the one or more first devices is a controller-capable device, and the the controller-capable device operates as a child network controller for controlling operation of a child network, the child network controller having a child network usable physical area indicating a farthest distance to which the child network controller can successfully communicate. At least one of the one or more second devices is within the child network usable physical area and operates as a child device in the child network. In this system, the first and second controllers exchange network information data via the child controller and the child device in the child network.

A method is provided method of sharing network information data between first and second ultrawide bandwidth networks in an ultrawide bandwidth scatternet. The method includes: transmitting a first beacon from a first controller in the first network, the first beacon including first network information data; receiving the first beacon at a second controller in the second network; and extracting the first network information data from the first beacon at the second controller.

The method may also include relaying the first beacon from the first controller to the second controller via a relay device located within a usable physical area of both the first controller and the second controller, the relaying of the first beacon being performed between the steps of transmitting the first beacon and receiving the first beacon.

The relay device is preferably either a member of the first network or a member of the second network.

The method may further include: transmitting a second beacon from the second controller, the second beacon including second network information data; receiving the second beacon at the first controller; and extracting the second network information data from the second beacon at the first controller.

The method may further include relaying the second beacon from the second controller to the first controller via a relay device located within the usable physical area of the first controller and the usable physical area of the second controller, the relaying of the second beacon being performed between the steps of transmitting the second beacon and receiving the second beacon.

The relay device is preferably either a member of the first network or a member of the second network.

The method may further include relaying the first beacon from the first controller to the second controller via a relay device located within the usable physical area of the first controller and the usable physical area of the second controller, the relaying of the first beacon being performed between the steps of transmitting the first beacon and receiving the first beacon; and relaying the second beacon from the second controller to the first controller via the relay device, the relaying of the second beacon being performed between the steps of transmitting the second beacon and receiving the second beacon.

The second network information data preferably includes at least one of: a version identifier, a broadcast message type, a router/controller identifier, an indicator of an age of the network information data, a count of a number of times the network information data has been passed between controllers or devices, a sequence number, a load feedback, a number of associated network devices, a neighborhood media access controller address, a data rate, a list of available network bridge connections, and a list of available network services.

The first network information data preferably includes at least one of: a version identifier, a broadcast message type, a router/controller identifier, an indicator of an age of the first network information data, a count of a number of times the first network information data has been passed between controllers or devices, a sequence number, a load feedback, a number of associated network devices, a neighborhood media access controller address, a data rate, a list of available network bridge connections, and a list of available network services.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings. In these drawings like reference numerals designate identical or corresponding parts throughout the several views.

FIG. 1 is a block diagram of the OSI standard for a computer communication architecture;

FIG. 2 is a block diagram of the IEEE 802 standard for a computer communication architecture;

FIG. 5 is a block diagram of a scatternet according to a preferred embodiment of the present invention;

DETAILED DESCRIPTION OF THE PREFERRED EMBODIMENTS

Embodiments of the present invention provide a scatternet topology that allows wireless communication between different devices in the scatternet,. During operation, the devices of the scatternet pass traffic between each other wirelessly. By comparison, traditional networking schemes allow devices from two different networks to communicate only via wired connections (i.e. bridging).

A scatternet is defined as a system made of multiple wireless networks, which are connected to each other by one or more wireless links (called hops). The networking system functions to discover the links between these different groups of mobile devices and to build and update those paths so any user can communicate with any other user, as long as each device has a link to one of the networks that form the scatternet. This autonomous system of mobile devices may operate in isolation or, may have gateways to interface with a fixed, i.e., wired, network.

Figure 3:
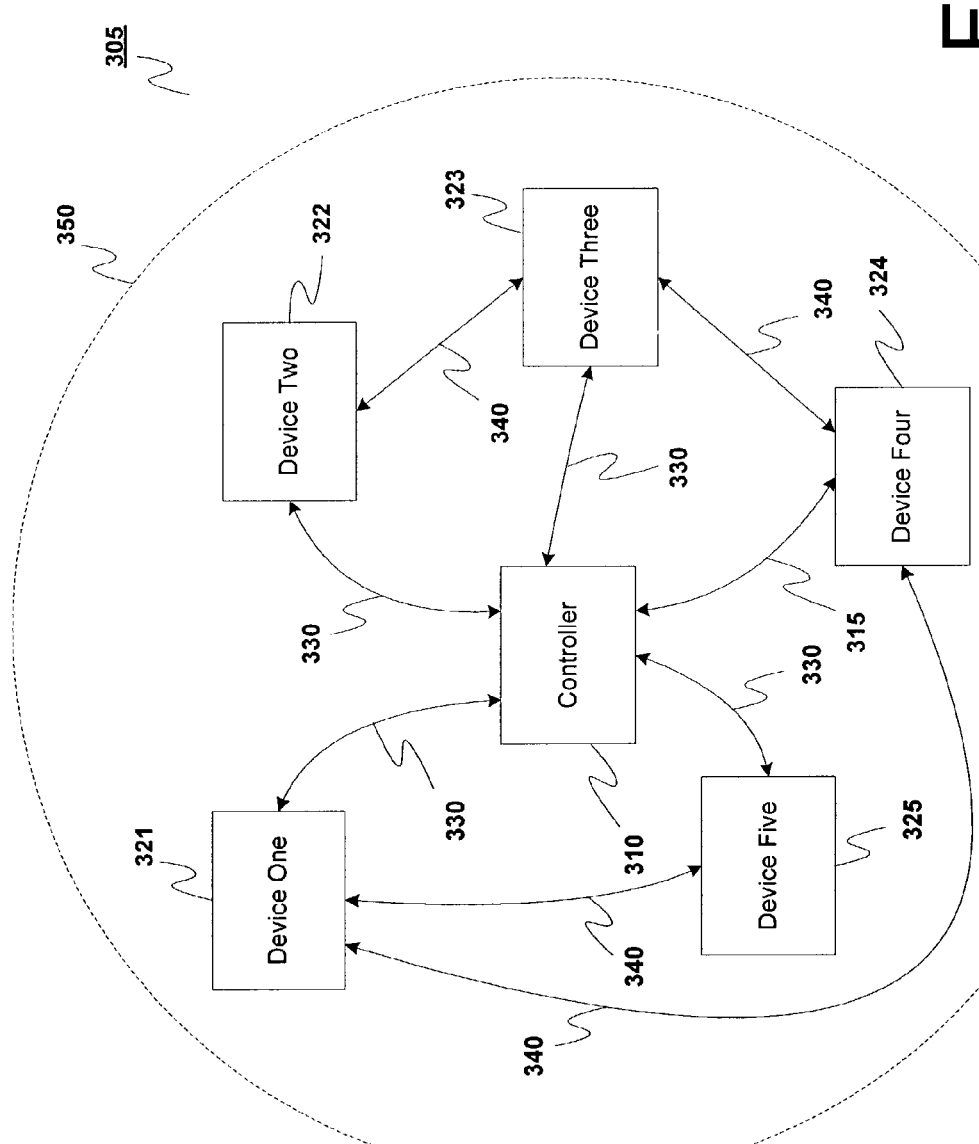
FIG. 3 is a block diagram of a wireless network.
Figure 4A:
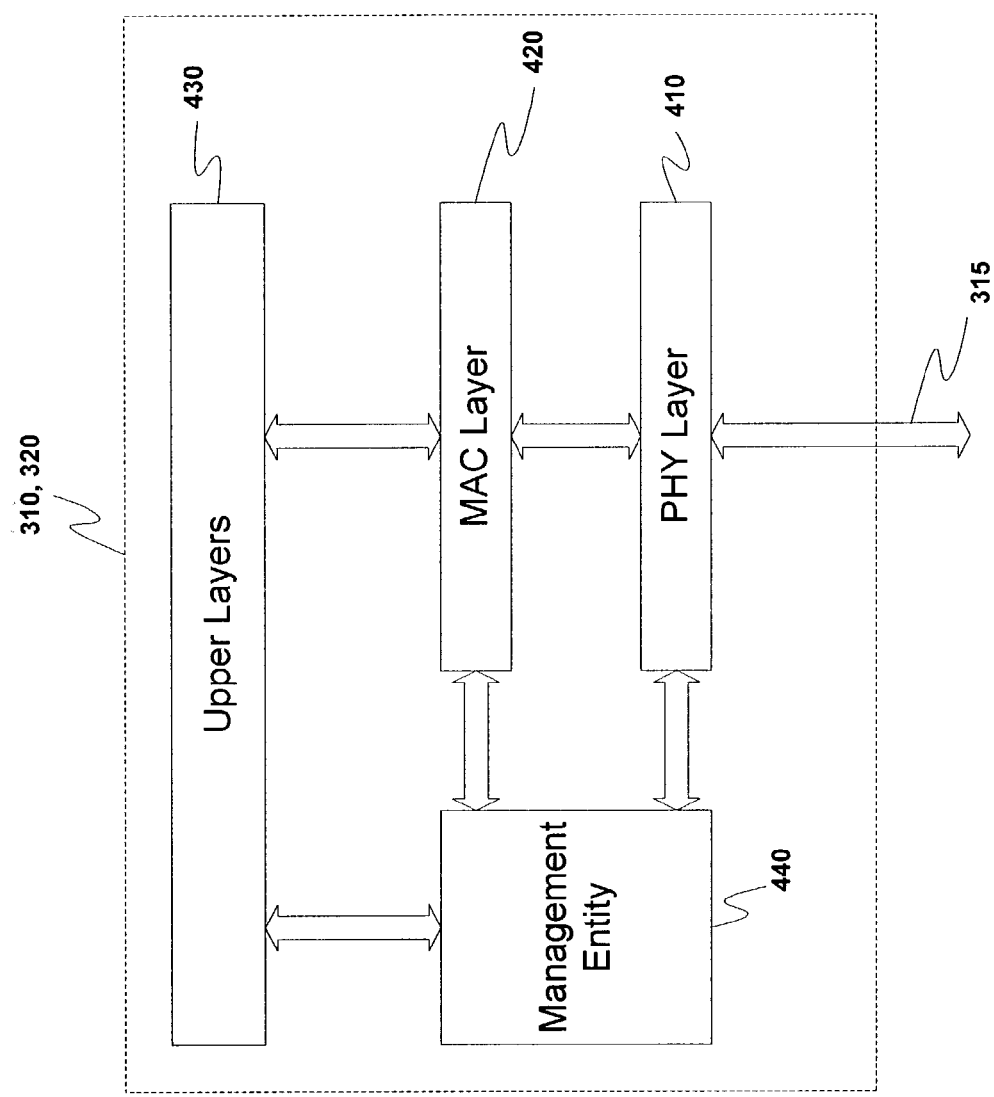
FIG. 4A is a block diagram of a device or controller in the wireless network of FIG. 3.
Figure 4B:
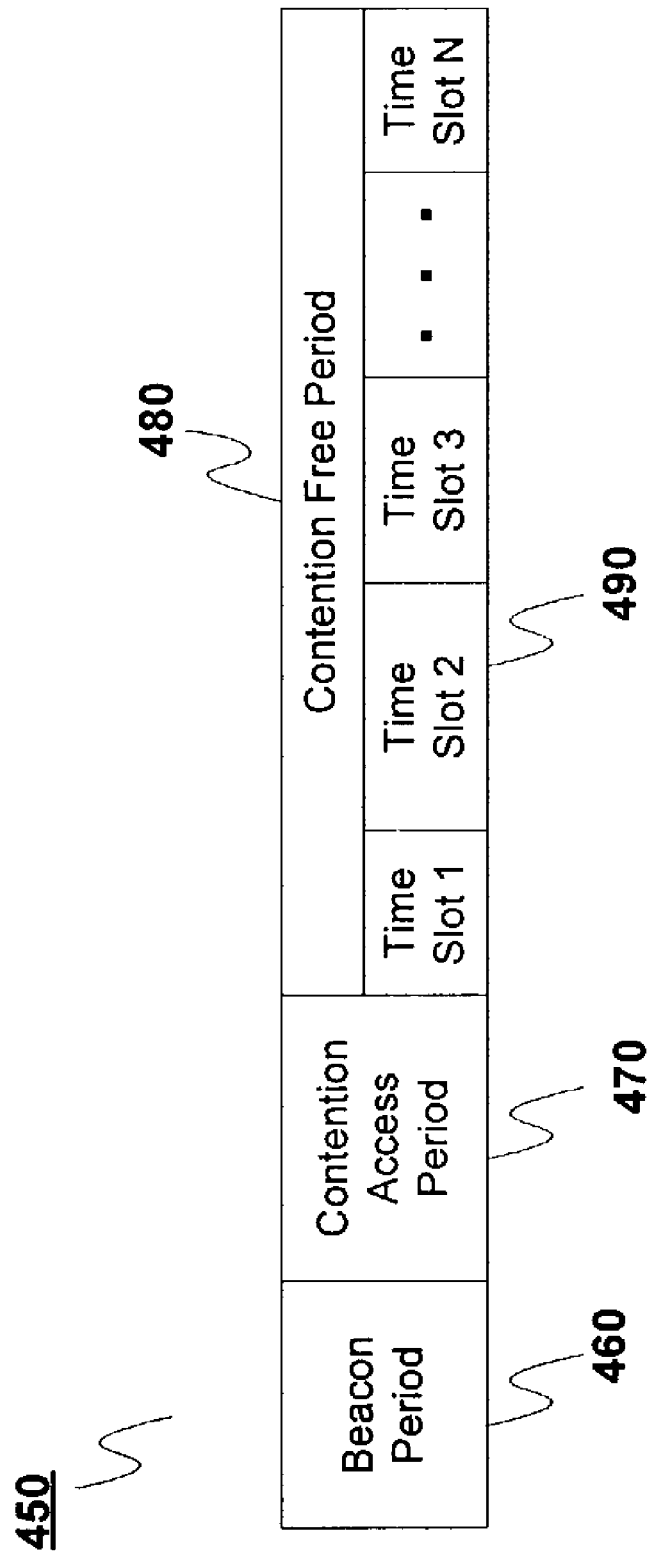
FIG. 4B illustrates an exemplary structure of a series of super-frames having a plurality of time slots during a contention free period according to a conventional method.

FIG. 5 is a block diagram of a scatternet according to a preferred embodiment of the present invention. The scatternet 500 includes three separate overlapping networks: network A 505a, network B 505b, and network C 505c. In basic function, elements in these networks 505a, 505b, 505c behave as corresponding elements shown in FIG. 3. The networks 505a, 505b, 505c may be piconets or other wireless networks, as described above with respect to FIG. 3.

As shown in FIG. 5, network A 505a includes a controller 510a, and a plurality of devices 521a–524a; network B 505b includes a controller 510a, and a plurality of devices 521b–522b; and network C 505c includes a controller 510c, and a plurality of devices 521c–523c. Each device 521a–524a, 521b–522b, 521c–523c is connected to its respective controller 510a, 510b, 510c via a primary wireless link 530. In addition, although not shown, each device 521a–524a, 521b–522b, 521c–523c may also be connected to one or more other devices 521a–524a, 521b–522b, 521c–523c within its network 505a, 505b, 505c via secondary wireless links, as described above with respect to FIG. 3.

The various devices 521a–524a, 521b–522b, 521c–523c of a given network are confined to a usable physical area 550a, 550b, 550c, which is set based on the extent to which the controller 510a, 510b, 510c can successfully communicate with each of the devices 521a–524a, 521b–522b, 521c–523c. Any device 521a–524a, 521b–522b, 521c–523c that is able to communicate with a given controller 510a, 510b, 510c (and vice versa) is within the usable area 550a, 550b, 550c of the network 505a, 505b, 505c. As noted, however, it is not necessary for every device 521a–524a, 521b–522b, 521c–523c in a given network 505a, 505b, 505c to communicate with every other device 521a–524a, 521b–522b, 521c–523c in that network.

Although three overlapping networks 505a, 505b, and 505c are shown in FIG. 5, alternate embodiments can include fewer or more networks. And while the embodiment of FIG. 5 shows all of the networks 505a, 505b, and 505c overlapping in usable area 550a, 550b, 550c, this need not be the case if some communication is possible between elements of the networks 505a, 505b, 505c.

In addition, although network A 550a is shown as having four devices 521a–524a, network B 550b is shown as having two devices 521b–522b, and network C 550c is shown as having three devices 521c–523c, alternate embodiments can vary the number of devices in each network.

In a scatternet 500 such as the one described above with reference to FIG. 5, devices 521a–524a, 521b–522b, 521c–523c that are simultaneously within the hearing range of two different networks 505a, 505b, 505c, will serve the role of wireless links/wireless bridges between the networks 505a, 505b, 505c. Those specific bridging devices are called wireless gateways or proxy nodes.

In FIG. 5, device A-4 524a and device C-1 521c may serve as wireless gateways. Device A-4 524a falls within the usable areas 550a and 550c of network A 505a and network C 505c, respectively. Similarly, device C-1 521c falls within the usable areas 550*b* and 550*c* of network B 505*b* and network C 505*c*, respectively.

Since it is desirable that any device 521*a*–524*a*, 521*b*–522*b*, 521*c*–523*c* be able to serve as a wireless gateway, all devices 521*a*–524*a*, 521*b*–522*b*, 521*c*–523*c* preferably have enough buffering and processing capability to handle wireless bridging, and should be capable of switching between two different channel frequencies since the adjacent network 505*a*, 505*b*, 505*c* might not use the same channel frequency as the originating one 505*a*, 505*b*, 505*c*. However, in alternate embodiments the bridging capability may be limited to certain devices.

As noted above, the controller 510*a*, 510*b*, 510*c* of a network 505*a*, 505*b*, 505*c* may be the same sort of device as any of the devices 521*a*–24*a*, 521*b*–522*b*, 521*c*–23*c*, except with the additional functionality for controlling the system and the requirement that it communicate with every device 521*a*–524*a*, 521*b*–522*b*, 521*c*–523*c* in the network 505*a*, 505*b*, 505*c*.

The operation of an exemplary controller-capable device and an exemplary non-controller-capable device will now be considered.

At power-up, the controller-capable device will listen on one or more previously configured channels for a random period of time. At the end of the listening period, it will either join an existing network as a regular device, contend for the role of controller in an existing network, form a child network of an existing network, or create a new network on a different channel from any existing adjacent networks.

If the controller-capable device creates a new network, it will preferably select a channel frequency that does not cause any significant interference to potential adjacent networks. Signal interference can be further reduced through the use of a dynamic transmit power control algorithm, as set forth in the proposed IEEE 802.15.3 standard. This would adjust the size of the usable physical area (i.e., the cell area) of the network in order to increase spatial reuse while still maintaining a good connectivity between networks.

At initialization, a non-controller-capable device will listen on one or more previously configured channels for a random period of time. At the end of the listening period, it will either join an existing network as a regular device, or enter an error state in indicating that it cannot join an existing network (e.g., there is no existing network, not enough bandwidth, etc.).

In operation, each controller 510*a*, 510*b*, 510*c* in the scatternet 500 will periodically send out a beacon to the devices within its usable physical area 550*a*, 550*b*, 550*c*. Preferably, these beacons, or any other broadcast message for that matter, will occasionally include additional network information about its associated network 505*a*, 505*b*, 505*c*. This network information can include: channel load; available bandwidth per class of service; a MAC address table of all devices 521*a*–524*a*, 521*b*–522*b*, 521*c*–523*c* associated with the network 505*a*, 505*b*, 505*c*), the respective data rate/link quality of each device 521*a*–524*a*, 521*b*–522*b*, 521*c*–523*c*, any eventual bridging connections that each device 521*a*–524*a*, 521*b*–522*b*, 521*c*–523*c* may have; and the type of service each device 521*a*–524*a*, 521*b*–522*b*, 521*c*–523*c* provides (e.g., printing, scanning, recording, DVD player, TV display). This network information is in addition to the other information fields that are already specified by the relevant data transmission specification (e.g., the IEEE 802.15.3 specification).

Before joining a network 505*a*, 505*b*, 505*c*, an unassociated device that does not have an active transmission request will first scan multiple channels (i.e., beacons) before selecting its network 505*a*, 505*b*, 505*c* by choosing a controller 510*a*, 510*b*, 510*c* to associate with. This decision may be based, for example, on criteria such as available bandwidth, link quality, or battery life. Other criteria are, of course, possible.

When the device associates with its selected controller 510*a*, 510*b*, 510*c*, it will preferably communicate to the controller 510*a*, 510*b*, 510*c* some information about adjacent networks 505*a*, 505*c*, 505*c* that it has collected during the scanning phase. This is in addition to any information required by the controller 510*a*, 510*b*, 510*c* for the device to join the network 505*a*, 505*c*, 505*c*.

The information about adjacent networks could include the following information, specific to a given network 505*a*, 505*c*, 505*c*: channel number, channel load, transmission power, a table of associated devices (i.e., nodes), the type of service available from each device, as well as the type of overlap areas between the network joined and any other network within the hearing range of the device. (See FIGS. 6A–6C and related discussion.)

Figure 6A:
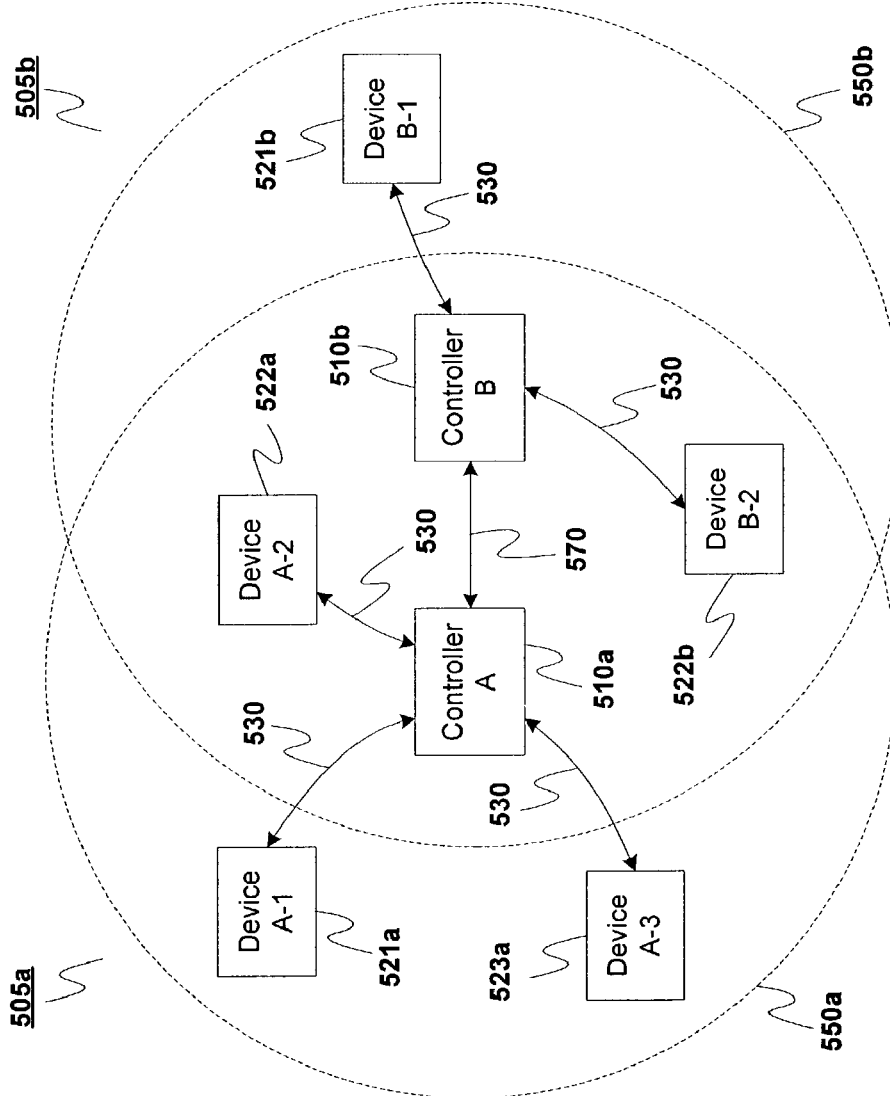
FIGS. 6A–6C illustrate three types of network overlap according to a preferred embodiment of the present invention.
Figure 6B:
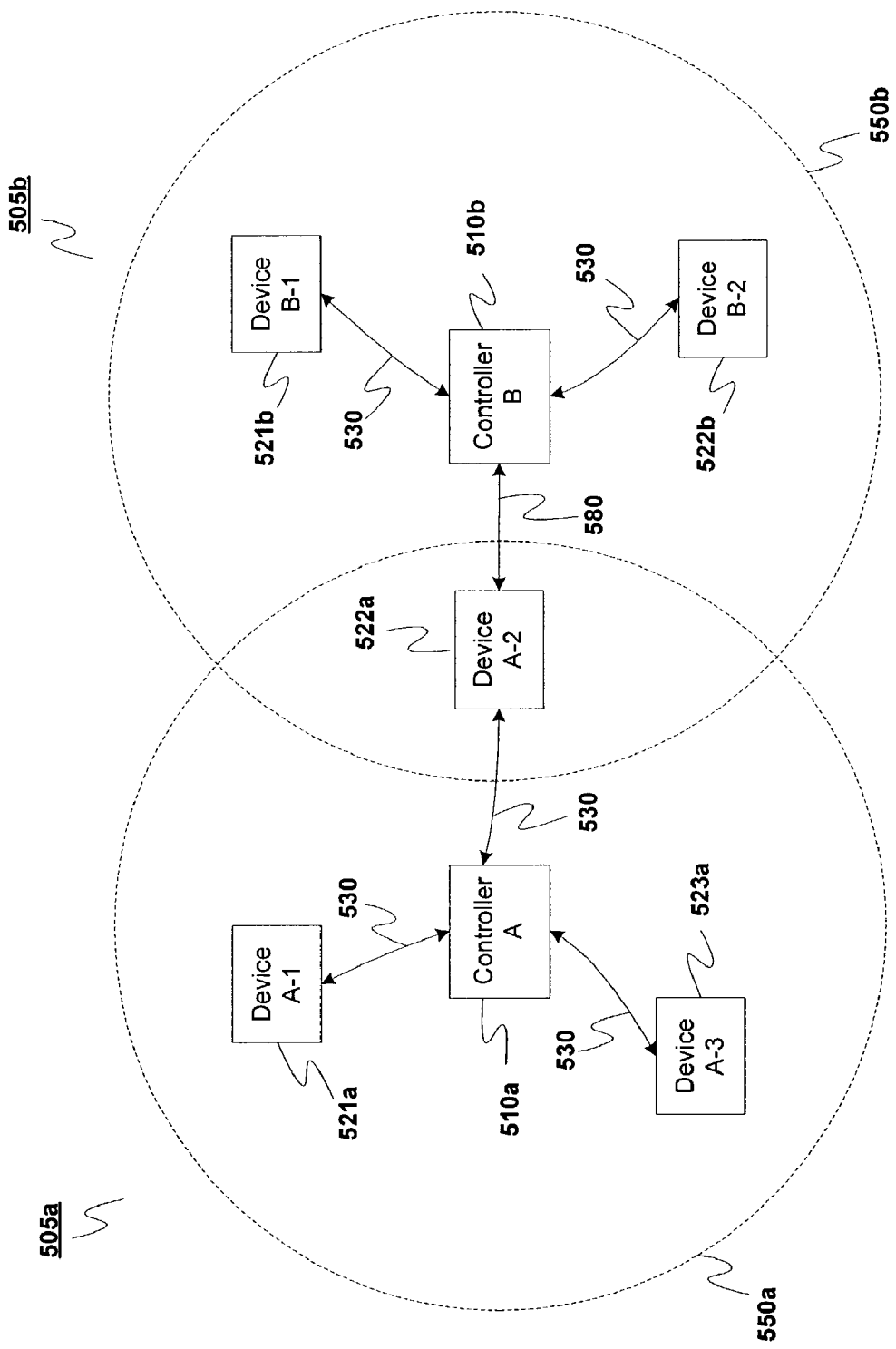
Figure 6C:
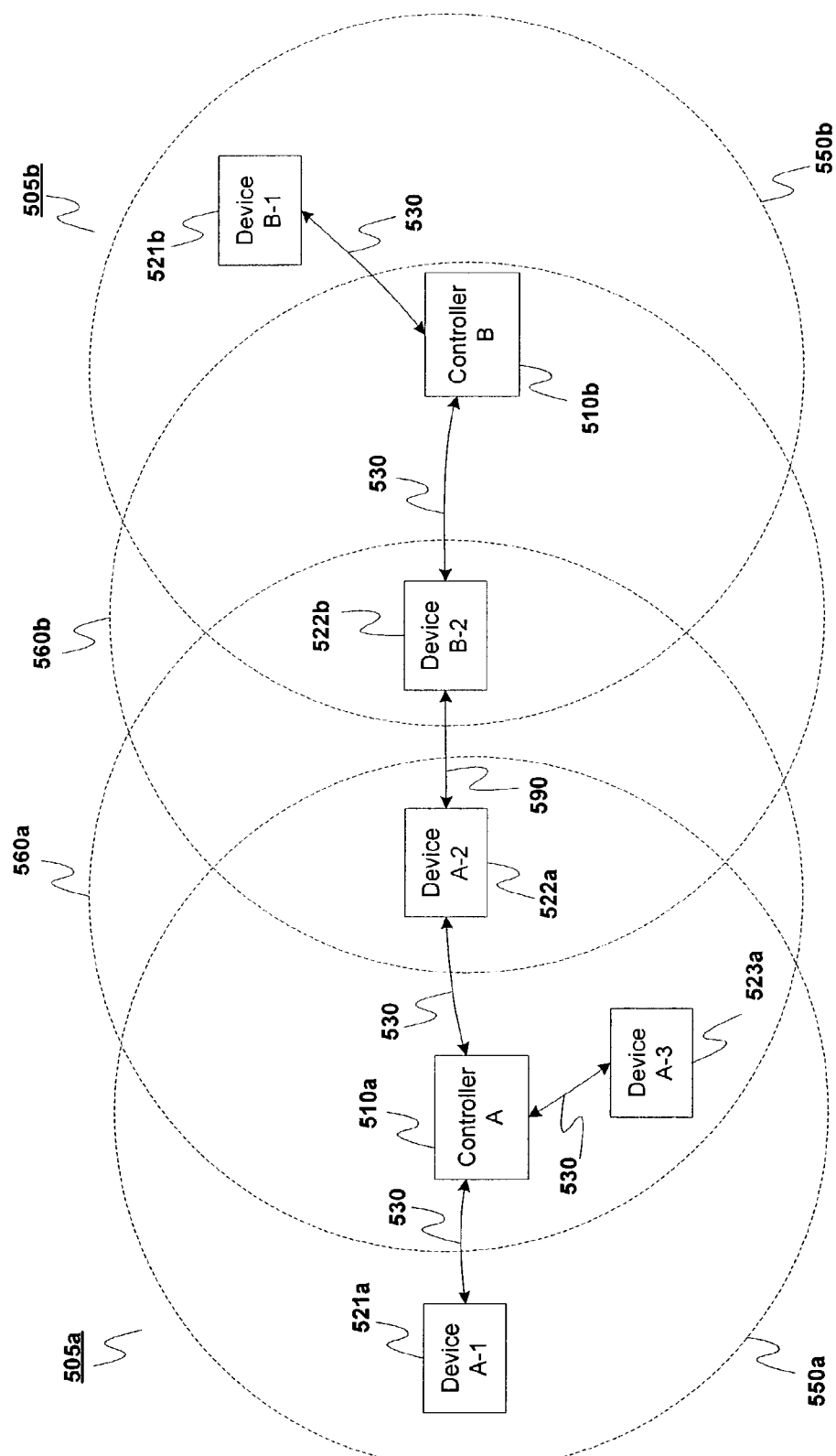

FIGS. 6A–6C illustrate three types of network overlap according to a preferred embodiment of the present invention. FIG. 6A illustrates direct overlap; FIG. 6B illustrates hidden overlap; and FIG. 6C illustrates indirect overlap.

FIG. 6A illustrates directly overlapping networks according to a preferred embodiment of the present invention. As shown in FIG. 6A, two networks partially overlap, network A 505*a* and network B 505*b*. Network A 505*a* includes a controller 510*a*, and three devices 521*a*–523*a*. Network B 505*b* includes a controller 510*b*, and two devices 521*b*–522*b*. These two networks 505*a*, 505*b* are shown by way of example only. In alternate embodiments greater numbers of networks could overlap, and each network could have varying numbers of devices.

In a direct overlap situation, the controllers 510*a*, 510*b* are both within the usable physical area 550*a*, 550*b* of the other network. Thus, each controller 510*a*, 510*b* can learn about the existence and settings of the other network 505*a*, 505*b* by directly monitoring the beacon provided by the controller 510*a*, 510*b* of the other network 505*a*, 505*b* through a direct inter-network wireless link 570.

Alternately, the controller 510*a*, 510*b* could use one of its guaranteed time slots to switch from one channel to another, thereby communicating with the other controller without disturbing its own network.

However, in addition to this direct connection, any network 505*a*, 505*b* in a direct overlap situation that had a device in the usable physical area 550*a*, 550*b* of the other network 505*a*, 505*b* (this applies to both networks in the present example) could also use that device as a proxy node to form an intermediary means of communication between the two controllers sifting on two different channels.

FIG. 6B illustrates hidden overlapping networks according to a preferred embodiment of the present invention. As shown in FIG. 6B, two networks partially overlap, network A 505*a* and network B 505*b*. Network A 505*a* includes a controller 510*a*, and three devices 521*a*–523*a*. Network B 505*b* includes a controller 510*b*, and two devices 521*b*–522*b*. These two networks 505*a*, 505*b* are shown by way of example only. In alternate embodiments greater numbers of networks could overlap, and each network could have varying numbers of devices.

In a hidden overlap situation, the controllers 510*a*, 510*b* are not both within the usable physical area 550*a*, 550*b* of the other network 505*a*, 505*b*. Thus, neither controller 510*a*, 510*b* can directly learn about the existence and settings of the other network 505*a*, 505*b* because it cannot hear the beacon provided by the controller 510a, 510b of the other network 505a, 505b. If both usable physical areas 550a and 550b are the same size, this will be a mutual condition. However, if the usable physical areas 550a and 550b were of different sizes, it would be possible that one controller 510a, 510b could hear the other controller 510a, 510b, but not vice versa. This would still be a hidden overlap situation because both controllers 510a and 510b could not hear each other.

However, with hidden overlap, at least one network 505a, 505b may have a device that is within the usable physical area 550a, 550b of the other network 505a, 505b. This overlapping device can then serve as a proxy node and pass beacon or broadcast message information between the two controllers 510a and 510b via an indirect inter-network wireless link 580.

It should be noted that although FIG. 6B discloses an overlapping device from both network A 505a and network B 505b, only one such device would be required for a hidden overlapping connection.

FIG. 6C illustrates indirect overlapping networks according to a preferred embodiment of the present invention. As shown in FIG. 6C, two adjacent networks (network A 505a and network B 505b) do not directly overlap. Network A 505a includes a controller 510a, and three devices 521a–523a. Network B 505b includes a controller 510b, and two devices 521b–522b. These two networks 505a, 505b are shown by way of example only. In alternate embodiments greater numbers of networks could be formed adjacent to each other, and each network could have varying numbers of devices.

In an indirect overlap situation, neither of the usable physical areas 550a and 550b of the two networks 505a and 505b overlap. Thus, none of the controllers 510a, 510b can learn about the existence and settings of the other network 505a, 505b either directly from the other controller 510a, 510b, or through a device in the other network 505a, 505b. This is because each controller 510a, 510b cannot communicate with any of the elements of the other network 505a, 505b.

However, where there is an indirect overlap, at least one controller-enabled device from one of the networks 505a, 505b may be capable of forming a child network (i.e., a network within an existing network) such that at least one device from the other existing network 505a, 505b is within the usable physical area 560a, 560b of that child network.

As shown in FIG. 6C, device A-2 522a in network A 505a is controller-enabled (i.e., it is capable of becoming a controller). And when device A-2 522a forms a child network, the usable physical area 560a of that child network is large enough to contain device B-2 522b. Similarly, if device B-2 522b in network B 505b were also controller-enabled (i.e., capable of becoming a controller), then it could form a child network whose usable physical area 560b was large enough to contain device A-2 522a. Regardless of which device 522a, 522b created the child network, the two devices 522a and 522b communicate with each other via a child wireless links 590.

Although FIG. 6C shows a situation in which both devices A-2 and B-2 522a and 522b are controller-enabled, it would be sufficient if only one of these devices A-2 and B-2 522a and 522b were controller-enabled. In either case, that device could form the child network and open the line of communication.

In the indirect overlap situation disclosed in FIG. 6C, device A-2 522a learns about the existence and settings of network B 505b by monitoring its beacon messages that are forwarded by device B-2 522b. Device A-2 522a then forwards this information to the controller 510a for network A 505a. Similarly, device B-2 522b learns about the existence and settings of network A 505a by monitoring its beacon messages that are forwarded by device A-2 522a. Device B-2 522b then forwards this information to the controller 510b for network B 505b.

In this way a pair of proxy nodes are formed by one device from each network 505a, 505b that create a child network. This child network then handles the functions of wireless bridging between the two networks 505a and 505b.

Regardless of the type of overlap, while associated in a network 505a, 505b, each device 521a–523a, 521b–522b should periodically be forced by its controller 510a, 510b to scan other channels to determine if a better controller is available, e.g., one with more available bandwidth, with a better QoS, with a better link quality, or with a lower transmit power). Devices should also periodically be forced by its controller 510a, 510b to look for adjacent networks and assume a proxy role with those networks if possible.

This can be accomplished by forcing a device to go into power save mode In the alternative, if time allows, the network can leverage the available period of inactivity of the superframe 450 (i.e., time slots 490 dedicated to other devices). This works particularly well if dynamic GTSs are used for the time slots 490, since the controller 510a, 510b of a network 505a, 505b can rearrange the order of its transmissions. If the device 521a–523a, 521b–522b discovers a better controller 510a, 510b within range, it should roam to that controller 510a, 510b.

If a device 521a–523a, 521b–522b within range of two networks 505a, 505b decides to become a proxy node, it should request one of the two controllers 510a. 510b to dynamically adjust its superframe size and beacon transmission time (TBTT) by sending a superframe adjust command.

Figure 7:
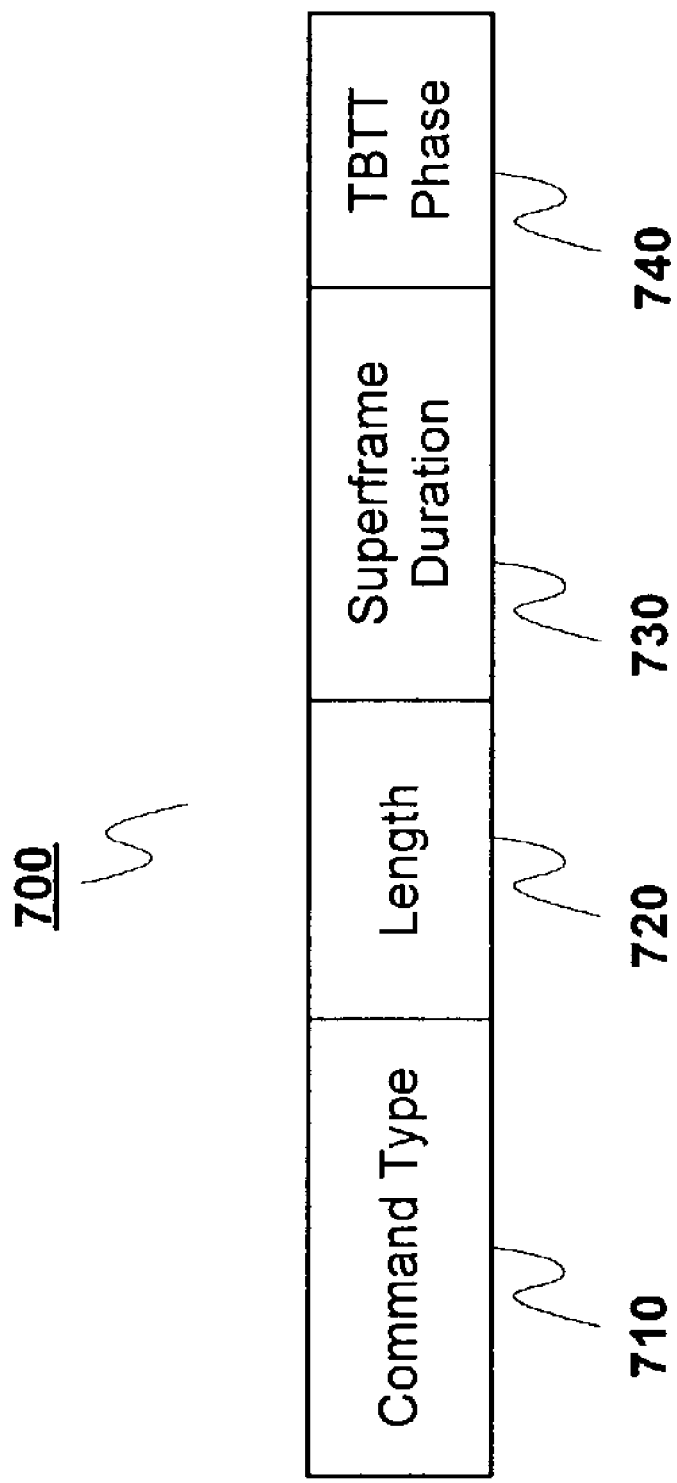
FIG. 7 shows a superframe adjust command according to a preferred embodiment of the present invention.

FIG. 7 shows a superframe adjust command according to a preferred embodiment of the present invention. As shown in FIG. 7, the superframe adjust command 700 may include a command type field 710, a length field 720, a superframe duration field 730, and a beacon transmission time (TBTT) phase field 740.

The superframe adjust command 700 will allow the proxy node to easily switch from one network 505a, 505b to another while still being able to alternatively receive the beacon message transmitted by the two controllers 510a, 510b.

If several devices can assume a proxy role with the same adjacent wireless network, the one with the biggest repeater memory size will be selected Furthermore, in order to maintain the synchronization of a proxy node with multiple networks 505a, 505b, each network 505a, 505b within the scatternet 500 will have to use a superframe 450 with an identical duration (e.g., set to a default value).

Each controller 510a, 510b will then be responsible for transmitting a broadcast message (beacon or other transmission) at a regular interval (e.g., every second or two). This broadcast message should include a list of all the devices that are associated to it, the type of service provided by each one of its associated devices, as well as some additional information such as supported data rate, available wired connections to the outside world, and other fields as needed.

The update time (i.e., the broadcast interval) could vary depending upon the degree of mobility of the devices and the topological rate of change for the particular application. Updates sent with a low duty cycle will minimize overhead.

In a visible overlap situation (See FIG. 6A), the controllers 510a and 510b will directly pass this information. In a hidden overlap situation (See FIG. 6B), the relevant controller 510a, 510b will pass this information to a proxy node (wireless bridge), which will relay the broadcast message to the other controller 510a, 510b. In an indirect overlap situation (See FIG. 6C), the relevant controller 510a, 510b will pass the broadcast information to a first proxy node in its own network 505a, 505b. The first proxy node will then relay the broadcast message to a second proxy node that is in both a child network with the first proxy node and in the other network controlled by the other controller 510a, 510b. The second proxy node will then relay the broadcast message to the other controller 510a, 510b.

Regardless of the type of overlap, once it receives a broadcast message from another network (via whatever route the message takes), the receiving controller 510a, 510b will then transmit this information to its respective devices 521a–523a, 521b–522b, which will update their network neighborhood list accordingly. Consequently, each device in each network 505a, 505b will have at any given point in time, full topology information for the entire scatternet 500.

Figure 8:
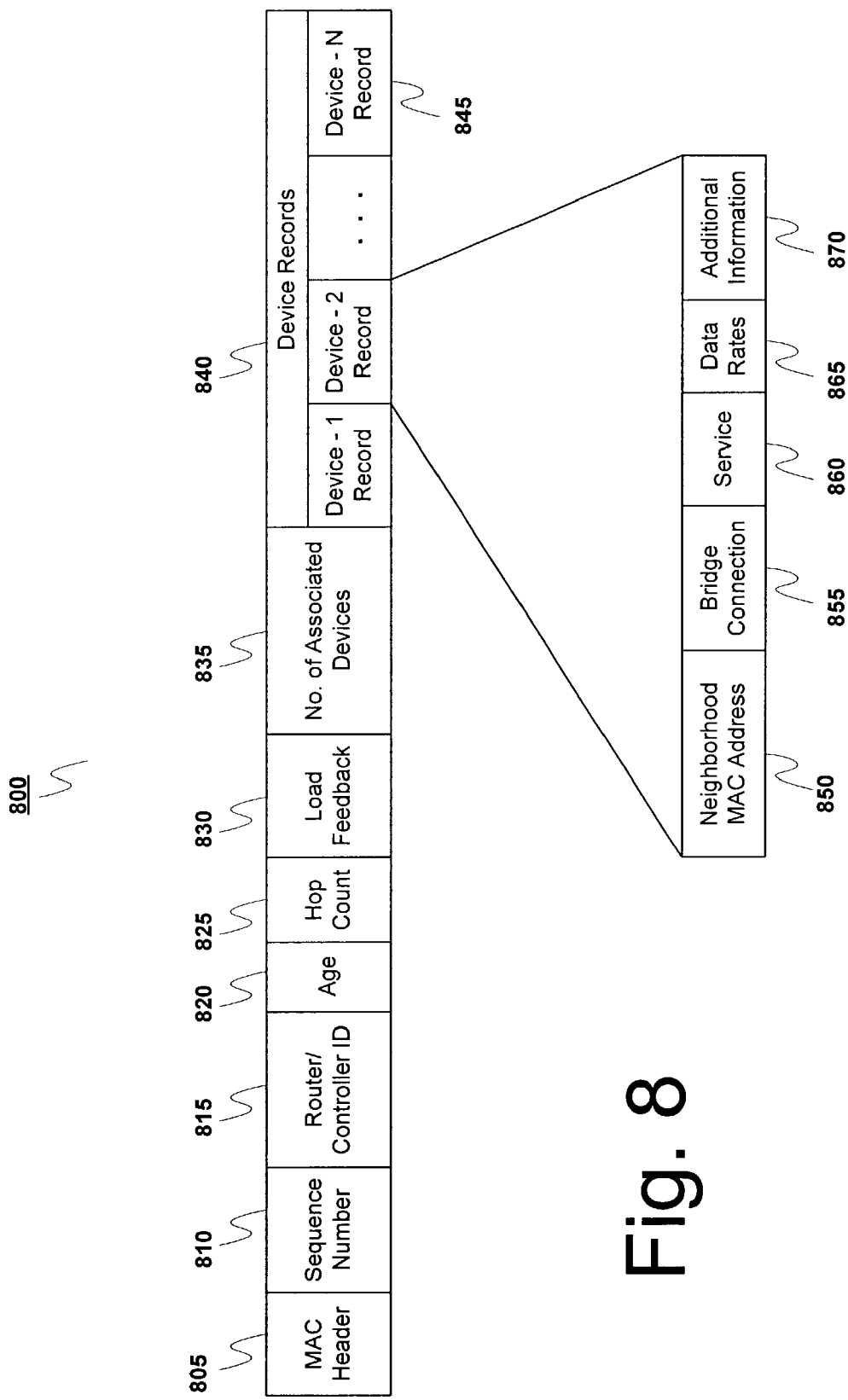
FIG. 8 shows the format of a broadcast message according to a preferred embodiment of the present invention.

FIG. 8 shows the format of a broadcast message, called the neighborhood information message, according to a preferred embodiment of the present invention. This broadcast message could be a modified beacon or a separate broadcast message. As shown in FIG. 8, a broadcast message according to a preferred embodiment of the present invention includes a MAC header field 805, a sequence number field 810, a router/controller identifier (ID) field 815, an age field 820, a hop count field 825, a load feedback field 830, a number of associated devices field 835, and a device record field 840. The device record field 840 includes one or more device records 845. Each device record 845 includes a neighborhood MAC address field 850, a bridge connection field 855, a service field 860, a data rate field 865, and any additional fields 870, as necessary. (The additional information fields 870 may be removed in some embodiments. The number of device records 845 in the device record field 840 will vary depending upon the number of devices in the network.

The sequence number field 810 includes a sequence number that can be used to distinguish a more recent neighborhood information message from an older one.

The router/controller ID field 815 includes a router/controller ID that identifies the MAC address of the controller that is sending its neighborhood table via the broadcast message.

The age field 820 includes information that indicates for how long the broadcast message is valid before it must be discarded (e.g., one or two seconds).

The hop count field 825 includes information that indicates how many hops from the source the neighborhood information message has traveled. This field is preferably set to "0" by the originating controller/router. Each proxy node will increment its value by one upon receiving it. In this preferred embodiment, the neighborhood information broadcast message will not be forwarded if the hop count field indicates a number of hops that is greater than "2." This restriction will limit the overhead generated by this protocol. Consequently, a device will only display a list of neighbors that are 0, 1 or 2 hops away. This number could be varied in alternate embodiments.

The load feedback field 830 indicates the amount of channel bandwidth, in time units, currently used for data transfers by associated devices. This enables new devices to estimate the current channel loading before attempting any association.

The number of associated devices field 835 indicates the total number devices directly associated to the controller of this specific wireless network The device record field 840 contains the list of all the devices directly associated to the controller/router as well as some metrics associated with each device. The neighborhood MAC address field 850 includes the neighborhood MAC address of the device associated with that entry. The bridge connection field 855 includes information relating to the availability of a bridging connection to the outside world through the device associated with that entry. The service field 860 includes information relating to the type of service provided by the device associated with that entry, e.g., printer, DVD, TV display, etc. The data rate field 865 includes information relating to the link data rate for the device associated with that entry. As noted above, other information 870 may also be contained in the device records 845 as needed.

By advertising the devices 521a–523a, 521b–522b, 521c–523c that have a connection (i.e., bridge) to the outside world (e.g., the Internet), the system will provide a mechanism for each device 521a–523a, 521b–522b, 521c–523c to gain external connectivity even if it is far from the physical location of the bridge connection.

Each device 521a–523a, 521b–522b, 521c–523c will preferably also have a network neighborhood visualization tool that will enable the end-user, equipped with a graphic interface, to display on his screen all the devices 521a–523a, 521b–522b, 521c–523c that can be reached directly or indirectly through a wireless gateway/proxy nodes as well as the services that each one of those devices 521a–523a, 521b–522b, 521c–523c provide (e.g., printing, scanner, DVD player, TV display, etc.). All operations will preferably be carried out from this user-friendly application (e.g., a Universal Remote Command).

This interface will preferably allow end-users to manage the available devices in a way that is very similar to managing files on a windows-based computer. It will indicate to the user know where the links in the network 505a, 505b, 505c currently are and will preferably be updated every five or ten seconds.

The update period for the network neighborhood visualization tool is voluntarily longer than the one for the link discovery broadcast message (e.g., five or ten seconds as compared to one or two seconds) in order to guarantee extra stability before deciding to report a new link or eliminate a dead link.

In order to decrease the complexity of a potentially highly deployable scatternet with multiple networks, the resolution of a device's map of the scatternet will be limited. The networking neighborhood visualization tool will preferably only display neighboring devices and services that are one or two hops away from the device. In alternate embodiments, however, this restriction can be modified to set the number of hops to be greater or smaller, or eliminated altogether. Obviously, numerous modifications and variations of the present invention are possible in light of the above teachings. For example, although the examples given are all ultrawide bandwidth network examples, the system and methods disclosed above are equally applicable to other wireless networks. It is therefore to be understood that within the scope of the appended claims, the invention may be practiced otherwise than as specifically described herein.

What is claimed is:

1. An ultrawide bandwidth wireless scatternet, comprising:
   a first network including
      a first controller for controlling operation of the first network, the first controller having a first usable physical area indicating a farthest distance to which the first controller can successfully communicate, and
      one or more first devices located in the first usable physical area; and a second network including
      a second controller for controlling operation of the second network, the second controller having a second usable physical area indicating a farthest distance to which the second controller can successfully communicate; and
      one or more second devices located in the second usable physical area,
   wherein one of the one or more first devices is a controller-capable device,
   wherein the controller-capable device operates as a child network controller for controlling operation of a child network, the child network controller having a child network usable physical area indicating a farthest distance to which the child network controller can successfully communicate,
   wherein at least one of the one or more second devices is within the child network usable physical area and operates as a child device in the child network, and
   wherein the first and second controllers exchange network information data via the child controller and the child device in the child network.

2. An ultrawide bandwidth wireless scatternet, as recited in claim 1, wherein the network information data includes at least one of: a router/controller identifier, an indicator of an age of the network information data, a count of a number of times the network information data has been passed between controllers or devices, a sequence number, a load feedback, a number of associated network devices, a list of neighborhood media access controller address, a list of supported data rates, a list of available network bridge connections, and a list of available network services.

3. An ultrawide bandwidth wireless scatternet, as recited in claim 1, wherein the network information data is exchanged in part via an ultrawide bandwidth beacon transmitted by the child controller.

4. An ultrawide bandwidth wireless scatternet, as recited in claim 1, wherein the network information data is exchanged via first and second ultrawide bandwidth broadcast messages transmitted by the child controller and the child device in the child network.

* * * * *